United States Patent
Suh et al.

(10) Patent No.: US 11,372,717 B2
(45) Date of Patent: Jun. 28, 2022

(54) MEMORY WITH SYSTEM ECC

(71) Applicant: QUALCOMM Incorporated, San Diego, CA (US)

(72) Inventors: Jungwon Suh, San Diego, CA (US); Michael Hawjing Lo, San Diego, CA (US); Dexter Tamio Chun, San Diego, CA (US); Xavier Loic Leloup, San Diego, CA (US); Laurent Rene Moll, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 16/944,110

(22) Filed: Jul. 30, 2020

(65) Prior Publication Data

US 2021/0064463 A1 Mar. 4, 2021

Related U.S. Application Data

(60) Provisional application No. 62/894,625, filed on Aug. 30, 2019.

(51) Int. Cl.
*G06F 11/10* (2006.01)
*G06F 3/06* (2006.01)

(52) U.S. Cl.
CPC ........ *G06F 11/1068* (2013.01); *G06F 3/0619* (2013.01); *G06F 3/0655* (2013.01); *G06F 3/0679* (2013.01)

(58) Field of Classification Search
CPC .. G06F 11/1068; G06F 11/10; G06F 11/1048; G06F 3/0619; G06F 3/0655; G06F 3/0679

USPC .......................... 714/764, 762, 763, 768, 770
See application file for complete search history.

(56) References Cited

U.S. PATENT DOCUMENTS

| | | | |
|---|---|---|---|
| 10,331,517 B2 | 6/2019 | Suh | |
| 10,846,169 B2* | 11/2020 | Cha | .......... G11C 29/44 |
| 2007/0101237 A1* | 5/2007 | Tamura | .......... G11C 29/76 |
| | | | 714/763 |
| 2009/0113133 A1* | 4/2009 | Kim | .......... G06F 13/1689 |
| | | | 711/133 |
| 2011/0088008 A1* | 4/2011 | Fifield | .......... G06F 30/39 |
| | | | 714/763 |

(Continued)

FOREIGN PATENT DOCUMENTS

EP 2068245 A2 6/2009

OTHER PUBLICATIONS

International Search Report and Written Opinion for International Patent Application No. PCT/US2020/045815, dated Feb. 17, 2021, 19 pages.

*Primary Examiner* — Guy J Lamarre
(74) *Attorney, Agent, or Firm* — Qualcomm Incorporated

(57) ABSTRACT

Methods and apparatuses for a system error-correcting code function are presented. The apparatus includes a memory configured to communicate with a host. The memory includes a memory array configured to store data. The memory is configured to provide the data stored in the memory array to the host in performing computing functions and configured to provide an error-correction code (ECC) associated with the data to the host. The ECC is not stored in the memory array in a first configuration of the memory and is stored in the memory array in a second configuration of the memory.

63 Claims, 15 Drawing Sheets

(56) References Cited

U.S. PATENT DOCUMENTS

| | | | |
|---|---|---|---|
| 2015/0039848 A1* | 2/2015 | Chun | G06F 3/0617 |
| | | | 711/202 |
| 2015/0162099 A1* | 6/2015 | Jeong | G06F 11/1008 |
| | | | 714/719 |
| 2016/0110252 A1* | 4/2016 | Hyun | G06F 11/1044 |
| | | | 714/766 |
| 2017/0004035 A1 | 1/2017 | Suh et al. | |
| 2017/0147432 A1 | 5/2017 | Suh et al. | |
| 2018/0060171 A1* | 3/2018 | Suh | G06F 11/10 |
| 2019/0056990 A1 | 2/2019 | Suh et al. | |
| 2020/0264950 A1* | 8/2020 | Schaefer | G11C 29/42 |
| 2020/0319882 A1* | 10/2020 | Liang | G06F 3/0617 |
| 2021/0055986 A1* | 2/2021 | Lam | G06F 11/1016 |
| 2021/0064462 A1* | 3/2021 | Eun | G11C 29/4401 |
| 2021/0200299 A1* | 7/2021 | Liang | G06F 1/3275 |
| 2021/0358559 A1* | 11/2021 | Suh | G11C 7/1045 |

* cited by examiner

910

MRxx (Mode Register Number = xx)

| OP[7] | OP[6] | OP[5] | OP[4] | OP[3] | OP[2] | OP[1] | OP[0] |
|---|---|---|---|---|---|---|---|
| Reserved | | | | SESC (System ECC Support and Configuration) | | | |

920

| Function | Register Type | Operand | Data |
|---|---|---|---|
| SESC | Read only | OP[3:0] | 0000₈: System ECC Not Supported<br>0001₈: System ECC parity[0:31] per x16 Channel and BL16<br>0010₈: System ECC parity[0:23] and AED E[0:7] per x16 Channel and BL16<br>0011₈: System ECC parity[0:15] and AED E[0:15] per x16 Channel and BL16<br>0100₈: System ECC parity[0:15] and AED E[0:7] per x16 Channel and BL16<br>0101₈: System ECC parity[0:11] and AED E[0:19] per x16 Channel and BL16<br>0110₈: System ECC parity[0:11] and AED E[0:7] per x16 Channel and BL16<br>Others: Reserved |

FIG. 9

MEMORY WITH SYSTEM ECC

This application claims the priority benefit of U.S. Provisional Application Ser. No. 62/894,625, entitled "Memory with System ECC" and filed on Aug. 30, 2019, which is expressly incorporated by reference herein in its entirety.

FIELD

The present disclosure relates generally to methods and apparatuses having memories with enhanced error detection and/or correction schemes and more particularly, to memories using system error detection codes (ECCs).

BACKGROUND

A computing device (e.g., a laptop, a mobile phone, etc.) may include one or several processors to perform various computing functions, such as telephony, wireless data access, and camera/video function, etc. A memory is an important component of the computing device. The processors may be coupled to the memory to perform the aforementioned computing functions. For example, the processors may fetch instructions from the memory to perform the computing function and/or to store within the memory temporary data for processing these computing functions, etc.

SUMMARY

This summary identifies features of some example aspects and is not an exclusive or exhaustive description of the disclosed subject matter. Additional features and aspects are described and will become apparent to persons skilled in the art upon reading the following detailed description and viewing the drawings that form a part thereof.

An apparatus in accordance with at least one embodiment includes a memory configured to communicate with a host. The memory includes a memory array configured to store data. The memory is configured to provide the data stored in the memory array to the host in performing computing functions and configured to provide an error-correction code (ECC) associated with the data to the host. The ECC is not stored in the memory array in a first configuration of the memory and is stored in the memory array in a second configuration of the memory.

Another apparatus in accordance with at least one embodiment includes a memory configured to communicate with a host. The memory includes a memory array configured to store data. The memory is configured to receive data from the host in performing computing functions, to store the data into the memory array, and to receive an ECC associated with the data from the host. The ECC is not stored in the memory array in a first configuration of the memory and is stored in the memory array in a second configuration of the memory.

Another apparatus in accordance with at least one embodiment includes a memory configured to communicate with a host. The memory includes a memory array configured to store data and an ECC associated with the data. The memory is configured to provide the data and to provide the ECC stored in the memory array, via a read ECC signal connection, to the host in performing computing functions. The read ECC signal connection being configured to provide a data mask from the host to the memory in a write operation.

Another apparatus in accordance with at least one embodiment includes a memory configured to communicate with a host. The memory includes a memory array configured to store data. The memory is configured to receive data from the host in performing computing functions, to receive an ECC associated with the data from the host, via a write ECC signal connection, and to store the data and the ECC into the memory array. The write ECC signal connection is configured to provide a data strobe to the host, in a read operation.

Another apparatus in accordance with at least one embodiment includes a host configured to communicate with a memory. The host is further configured to receive data from the memory in performing computing functions and to receive an ECC associated with the data, via a read ECC signal connection, from the memory. The data and the ECC is stored in a memory array of the memory. The read ECC signal connection is configured to provide a data mask from the host to the memory in a write operation.

Another apparatus in accordance with at least one embodiment includes a host configured to communicate with a memory. The host is further configured to provide data to the memory in performing computing functions and to provide an ECC associated with the data, via write ECC signal connection, to a memory array of the memory. The write ECC signal connection is configured to provide a data strobe to the host, in a read operation.

A method to operate a system ECC function is presented. The method includes providing, by a memory, data stored in a memory array of the memory to a host in performing computing functions. The method further includes providing, by the memory, an error-correction code (ECC) associated with the data to the host. The ECC is not stored in the memory array in a first configuration of the memory and is stored in the memory array in a second configuration of the memory.

Another method to operate a system ECC function is presented. The method includes receiving, by a memory, data from a host in performing computing functions. The method further includes storing, by the memory, the data into a memory array of the memory. The method further includes receiving, by the memory, an ECC associated with the data from the host. The ECC is not stored in the memory array in a first configuration of the memory and is stored in the memory array in a second configuration of the memory.

Another method to operate a system ECC function is presented. The method includes providing, by a memory, data stored in a memory array of the memory to a host in performing computing functions. The method further includes providing, by the memory, an ECC associated with the data and stored in the memory array to the host in performing computing functions, via a read ECC signal connection. The read ECC signal connection is configured to provide a data mask from the host to the memory in a write operation.

Another method to operate a system ECC function is presented. The method includes receiving, by a host, data from a memory in performing computing functions. The method further includes receiving, by the host, an ECC associated with the data via a read ECC signal connection, from the memory. The data and the ECC are stored in a memory array of the memory. The read ECC signal connection is configured to provide a data mask from the host to the memory in a write operation.

Another method to operate a system ECC function is presented. The method includes providing, by a host, data to a memory in performing computing functions. The method further includes providing, by the host, an ECC associated with the data, via write ECC signal connection, to a memory array of the memory. The write ECC signal connection is configured to provide a data strobe to the host, in a read operation.

BRIEF DESCRIPTION OF THE DRAWINGS

Various aspects of apparatus and methods will now be presented in the detailed description by way of example, and not by way of limitation, with reference to the accompanying drawings, wherein:

FIG. 9 illustrates an embodiment of the mode register of the apparatus of FIG. 3, in accordance with certain aspects of the present disclosure.

DETAILED DESCRIPTION

Figure 1:
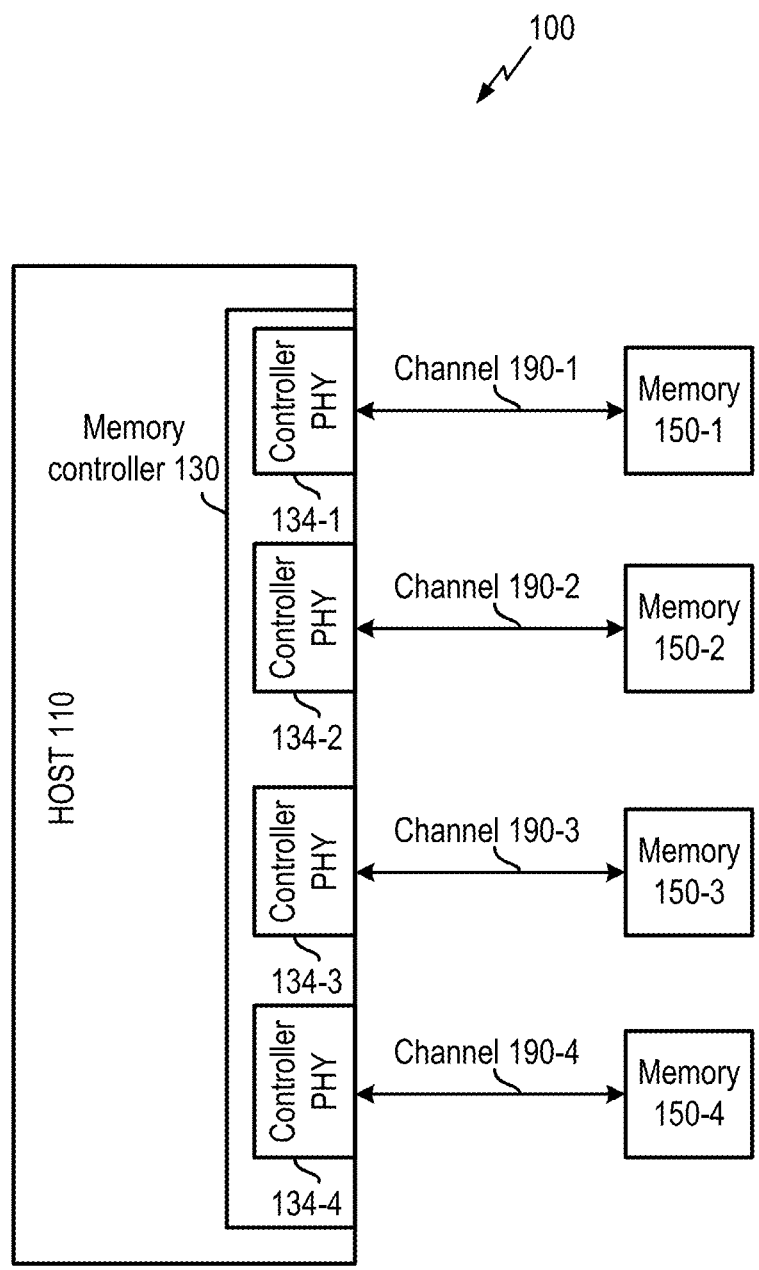
FIG. 1 illustrates an apparatus incorporating a host, memories, and channels coupling the host and the memories.

The detailed description set forth below in connection with the appended drawings is intended as a description of various configurations and is not intended to represent the only configurations in which the concepts described herein may be practiced. The detailed description includes specific details for providing a thorough understanding of various concepts. However, it will be apparent to those skilled in the art that these concepts may be practiced without these specific details. In some instances, well known structures and components are shown in block diagram form to avoid obscuring such concepts.

As used herein, the term "coupled to" in the various tenses of the verb "couple" may mean that element A is directly connected to element B or that other elements may be connected between elements A and B (i.e., that element A is indirectly connected with element B), to operate certain intended functions. In the case of electrical components, the term "coupled to" may also be used herein to mean that a wire, trace, or other electrically conductive material is used to electrically connect elements A and B (and any components electrically connected therebetween). In some examples, the term "coupled to" mean a transfer of electrical energy between elements A and B, to operate certain intended functions.

In some examples, the term "electrically connected" mean having an electric current or configurable to having an electric current flowing between the elements A and B. For example, the elements A and B may be connected via resistors, transistors, or an inductor, in addition to a wire, trace, or other electrically conductive material and components. Furthermore, for radio frequency functions, the elements A and B may be "electrically connected" via a capacitor.

The terms "first," "second," "third," etc. are employed for ease of reference and may not carry substantive meanings. Likewise, names for components/modules may be adopted for ease of reference and might not limit the components/modules. For example, such non-limiting names may include "read ECC" signal connection and "write ECC" signal connection. Modules and components presented in the disclosure may be implemented in hardware, software, or a combination of hardware and software. In some examples, the modules and components presented in the disclosure may be implemented in hardware only.

The term "bus system" may provide that elements coupled to the "bus system" may exchange information therebetween, directly or indirectly. In such fashion, the "bus system" may encompass multiple physical connections as well as intervening stages such as buffers, latches, registers, etc. A module may be implemented in hardware, software, or a combination of hardware and software.

The term error-correcting code or codes (ECC or ECCs) in the present disclosure may refer to error detection, error correcting, or error detection and correcting codes. The ECCs are not be limited to a particular type of coding. In some examples, the ECCs may include Hamming codes and/or parity codes.

Memories in the present disclosure may be embedded within a processor on a semiconductor die or be part of a different semiconductor die. The memories may be of various kinds. For example, the memory may be static random access memory (SRAM), dynamic random access memory (DRAM), magnetic random access memory (MRAM), NAND flash, or NOR flash, etc.

Methods and apparatuses are presented in the present disclosure by way of non-limiting examples of Low-Power Double Data Rate (LPDDR) Synchronous Dynamic Random Access Memory (SDRAM). For example, the LPDDR memory operating in accordance with LPDDR specification promulgated by Joint Electronic Device Engineering Council (JEDEC). One such LPDDR specification may be LPDDR5.

As demands grow for the computing device to perform more functions with increasing speed, errors with data stored in a memory may grow as well. Errors may grow as data stored in memories and transferred between blocks increase. One example of error correction code (ECC) for a link between a host and a memory is provided in U.S. Pat. No. 10,331,517, assigned to the assignee hereof and expressly incorporated herein by reference in its entirety. Schemes to improve error detection/correction in accessing a memory, without overburdening a host or the memory, are advantageous to improve system performance.

In addition to the link ECC provided in U.S. Pat. No. 10,331,517, other ECC schemes may be utilized. For example, within a memory, the memory may utilize array ECC that detect and/or correct errors within the memory. A host coupled to memory may separately utilize a different memory for ECC on a system-level (system ECC). In some examples, end-to-end system ECC may be implemented in a host by adding large density on-chip SRAM to store In-line ECC parity bits for certain data to enhance overall data reliability. However, such high density on-chip SRAM is very expensive in terms of overall system cost, and high density SRAM is susceptible to soft errors associated with SRAM cells.

In the present disclosure, system ECC parity bits are generated inside a host and transferred through RDQS_t (in a write operation) and DM (in a read operation) between the host and a memory device. The system parity bits may be stored together with a given data into DRAM cell array, so the ECC protection provides an unified and consistent way to reduce overall system cost by removing on-chip SRAM and to achieve better performance without requiring a separate memory link ECC.

The present disclosure thus provides a simplified and efficient ECC scheme to implement the system ECC by sharing certain resources of the link ECC. In such fashion, overall system cost might be reduced and performance improved.

FIG. 1 illustrates an apparatus 100 incorporating a host 110, memories 150, and channels 190 coupling the host 110 and the memories 150. The apparatus 100 may be, for example, a device among computing systems (e.g., servers, datacenters, desktop computers), mobile computing device (e.g., laptops, cell phones, vehicles, etc.), Internet of Things devices, virtual reality (VR) systems, or augmented reality (AR) systems, etc. The host 110 may include at least one processor, such as central processing unit (CPU), graphic processing unit (GPU), digital signal processor (DSP), multimedia engine, and/or neural processing unit (NPU). The host 110 may be configured to couple and to communicate to the memories 150 (e.g., memories 150-1 to 150-4), via channels 190 (e.g., channels 190-1 to 190-4), in performing the computing functions, such as one of data processing, data communication, graphic display, camera, AR or VR rendering, image processing, neural processing, etc. For example, the memories 150 may store instructions or data for the host to perform the aforementioned computing functions.

The host 110 may include a memory controller 130, which may include controller PHY modules 134-1 to 134-4. Each of the controller PHY modules 134-1 to 134-4 may be coupled to a respective one of the memories 150-1 to 150-4, via respective channels 190-1. For ease of reference, read and write are referenced from a perspective of the host 110. For example, in a read operation, the host 110 may receive via the channel 190 data stored from the memories 150. In a write operation, the host 110 may provide via the channel 190 data to be written into the memories 150 for storage. The memory controller 130 may be configured to control various aspects, such as logic layers, of communications to and from the memories 150. The controller PHY modules 134 may be configured to control electrical characteristics (e.g., voltage levels, phase, delays, frequencies, etc.) of signals provided or received on the channel 190.

In some examples, the memories 150 may be LPDDR DRAM (e.g., LPDDR5). The host 110, the memories 150, and/or the channels 190 may operate according to an LPDDR (e.g., LPDDR5) specification. In some examples, each of the channels 190 may include 16 bits of data (e.g., 16 DQs). In some examples, each of the channels 190 may operate on 32 bits of data. In FIG. 1, four channels are shown. In some examples, the apparatus 100 may include 8 or 16 channels.

Figure 2:
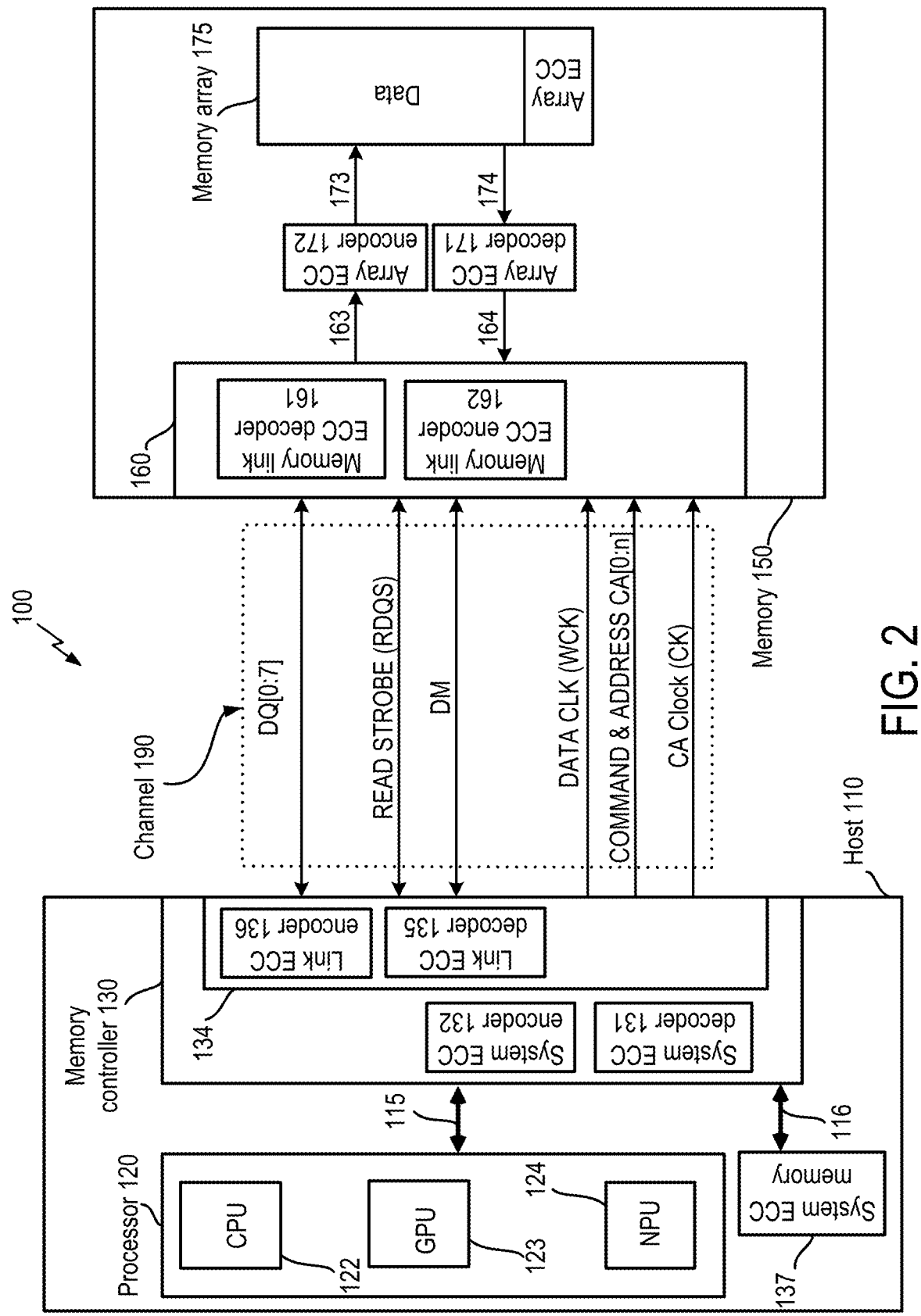
FIG. 2 illustrates another representation of the apparatus having the host, the memory, and the channel of FIG. 1.

The channel 190 is shown with greater specificity in FIG. 2. FIG. 2 illustrates another representation of the apparatus having the host 110, the memory 150, and the channel 190 of FIG. 1. The channels 190 may include a data clock (e.g., WCK) used in providing data to the respective memories 150 and a read data strobe (e.g., RDQS) used in receiving data from the respective memories 150, on a per byte basis. The channels 190 may further include a data mask (e.g., DM, sometimes referred to as DMI to indicate multiple functions performed by the signal connection) signaling used to mask certain part of data in a write operation. The channels 190 may further include command and address (e.g., CA) and associated CA clock to provide commands (e.g., read or write commands) to the respect memories 150.

The host 110 may include at least one processor 120, which may include a CPU 122, a GPU 123, and/or an NPU 124. The host 110 may further include a memory controller 130 having a controller PHY module 134. The memory controller 130 may couple to the at least one processor 120 via a bus system 115 in performing the various computing functions. The host 110 may be configured to perform multiple ECC functions. To support a system ECC function, the host 110 may include a system ECC memory 137. The memory controller 130 may be coupled to the system ECC memory 137 via a bus system 116. The memory controller 130 may further include a system ECC decoder 131 and a system ECC encoder 132. The controller PHY modules 134 may include a link ECC decoder 135 and a link ECC encoder 136.

The apparatus 100 may implement the system ECC function to detect/correct errors arising in performing computing functions (e.g., operating with the at least one processor 120). The system ECC function might be useful for applications with low error tolerance, such as automotive applications. In some examples, the system ECC encoder 132 may generate system ECC to a block of data. The memory controller 130 may send the block of data to other modules, such as the at least one processor 120 and/or the memory 150, along with the system ECC. For example, the system ECC may be sent to the memory 150, which may store the system ECC in the same fashion as data and not perform ECC function based on the system ECC. In some examples, the memory controller 130 may receive a block of data and associated system ECC from, for example, the at least one processor 120 and/or the memory 150. The memory controller 130 may then detect/correct errors in the block of data using the system ECC.

The host 110 is coupled to the memory 150 via the channel 190, which is illustrated for a byte of data, DQ[0:7]. The channel 190 and signaling between the host 110 and the memory 150 may be implemented in accordance with the JEDEC DRAM specification (e.g., LPDDR5). As illustrated, the channel 190 includes signals connections of the DQs, a read data strobe (RDQS), a data mask (DM), a data clock (WCK), command and addresses (CAs), and command and address clock (CK). The host 110 may use the read data strobe RDQS to strobe (e.g., to clock) data in a read operation to receive the data on the DQs. The memory 150 may use the data mask DM to mask certain part of data from write in a write operation. The memory 150 may use the data clock WCK to sample data on the DQs for a write operation. The memory 150 may use the command and address clock CK to clock (e.g., to receive) the CAs. A signal connection for each of the signaling may include a pin at the host 110, a pin at the memory 150, and a conductive trace or traces electrically connecting the pins.

The memory 150 may include a memory I/O module 160 (e.g., a PHY layer) configured to control electrical characteristics (e.g., voltage levels, phase, delays, frequencies, etc.) to provide or to receive signals on the channel 190. For example, memory I/O module 160 may be configured to capture (e.g., to sample) data, commands, and addresses from the host 110 via the channel 190 and to output data to the host 110 via the channel 190. The memory I/O module 160 may include a memory link ECC decoder 161 and a memory link ECC encoder 162.

The memory 150 may further include a memory array 175, which may include multiple memory cells (e.g., DRAM memory cells) that store data (e.g., information in general). The host 110 may read data stored in the memory array 175 and write data into the memory array 175, via the channel 190. Moreover, the memory array 175 may be configured to store ECCs, such as array ECCs, that is associated with the stored data. For example, a block of data (e.g., a word) may be associated with an array ECC via a shared address. For example, reading (or writing into) the shared address at the memory array 175 may read out (or write into) both the block of data at the address and the array ECC associated with that block of data.

The memory 150 may further include an array ECC decoder 171 and an array ECC encoder 172 to support an array ECC function. The array ECC decoder 171 may couple to the memory I/O module 160 via a node 163 and couple to the memory array 175 via a node 173. The array ECC encoder 172 may couple to the memory I/O module 160 via a node 164 and couples to the memory array 175 via a node 174. In some example, the array ECC function may detect/correct errors occurred to data stored in the memory array 175. As semiconductor process advances, memory cells are pushed to physical limits, and errors of stored data may arise, even if the data were not accessed. Accordingly, the array ECC function might be implemented to detect and/or correct those errors in storage. In some examples, the host 110 might not access or even aware of the array function.

In some example, the array ECC function may be encoded (by the array ECC encoder 172) and decoded (by the array ECC decoder 171) within the memory 150. In a write operation, write data (e.g., received from the host 110 via the channel 190) may be provided to the array ECC encoder 172 via the node 163. The array ECC encoder 172 may generate an array ECC from the write data. The write data and the associated array ECC may be written into the memory array 175 via the node 173. The write data and the associated array ECC may be stored in the memory array 175 and share a common address. Thus, the write data and the associated array ECC may be accessed (read or write) via the shared common address.

In a read operation, data stored and associated array ECC stored in the memory array 175 may be provided to the array ECC decoder 171 via the node 174. The array ECC decoder 171 may detect/corrects in the data using the array ECC. The corrected data may be provided to the memory I/O module 160 via the node 164 as read data. The memory I/O module 160 may provide the read data to the host 110 via the channel 190. Thus, the array function could be transparent to the host 110.

Further, the apparatus 100 may include a link ECC function to detect/correct errors arising from data transmissions in the channel 190. For example, in a write operation, the link ECC encoder 136 may generates a link ECC associated with a block of data to be written (e.g., write data) into the memory 150. The host 110 may provide the write data to the memory 150 via DQs signal connections and provide the link ECC to the memory 150 via a signal connection of the read data strobe RDQS. At the memory 150, the memory link ECC decoder 161 may use the link ECC to detect/correct errors in the write data. The link ECC might not stored in the memory array 175, as the link ECC function is resolved at the memory I/O module 160.

In a read operation, the memory link ECC encoder 162 may receive data (e.g., read data) stored in the memory array 175 (e.g., via the node 174, the array ECC decoder 171, and the node 164) and generate the link ECC associated with the read data. The memory I/O module 160 may provide the read data to the host 110 via the signal connections of the DQs and provide the link ECC to the host 110 via the signal connection of the data mask DM. At the host 110, the link ECC decoder 135 may detect/correct errors in the read data using the link ECC.

As presented above, the apparatus 100 may operate multiple layers of ECC functions, each of the schemes may operate independent of others. Such multi-layered scheme create inefficiency. Certain aspects of the present disclosure provide a system ECC function that share signal connections with the link ECC function. In such fashion, system complexity and therefore, system cost, are reduced.

Figure 3:
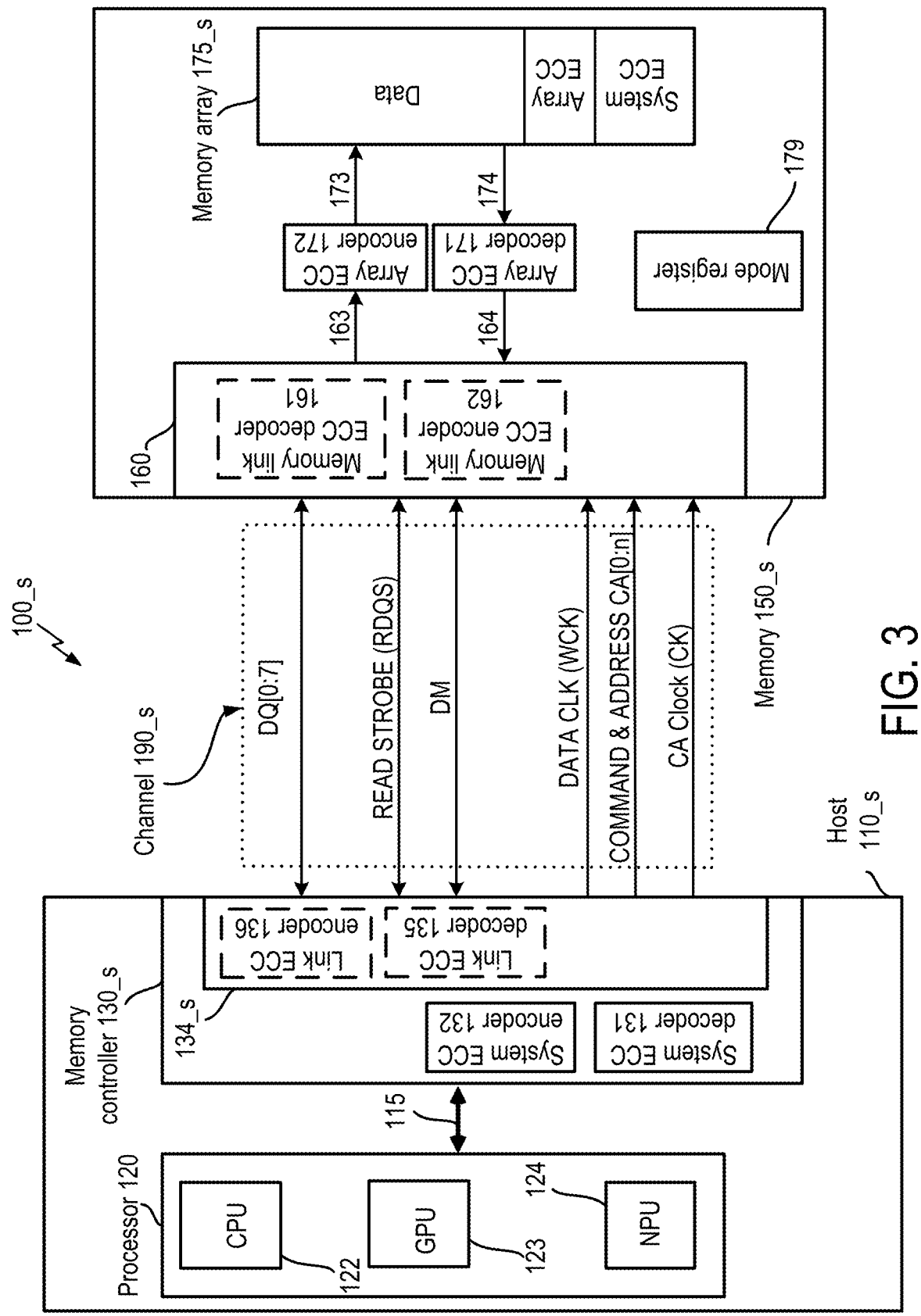
FIG. 3 illustrates another embodiment of the apparatus of FIG. 1, in accordance with certain aspects of the present disclosure.

FIG. 3 illustrates another embodiment of the apparatus 100 of FIG. 1, in accordance with certain aspects of the present disclosure. In FIG. 3, the apparatus 100_s is shown with various functional blocks and is configured to support a novel system ECC function. The apparatus 100_s may include a host 110_s configured to couple to and to communicate with a memory 150_s via a channel 190_s in performing various computing functions, such as one of data processing, data communication, graphic display, camera, AR or VR rendering, image processing, neural processing, etc. For example, the memories 150_s may store instructions or data for the host to perform the aforementioned computing functions.

The host 110_s may include at least one processor 120, which may include the CPU 122, the GPU 123, and/or the NPU 124 (see FIG. 2). The host 110_s may further include the memory controller 130_s having the controller PHY module 134_s. The memory controller 130_s may couple to the at least one processor 120 via a bus system 115 in performing the various computing functions. The controller PHY modules 134_s may be configured to control electrical characteristics (e.g., voltage levels, phase, delays, frequencies, etc.) of signals provided or received on the channel 190_s.

The host 110_s may be configured to implement a system ECC function utilizing the memory 150_s, via the channel 190_s. For example, via signal connections of the data mask DM and/or the read data strobe RDQS of the channel 190_s. For the system ECC function, the memory controller 130_s may include the system ECC decoder 131 and the system ECC encoder 132. In performing the computing functions, the system ECC encoder 132 of the memory controller 130_s may generate a system ECC code for a block of data and provide the block of data and the system ECC code to the at least one processor 120 via the bus system 115. The memory controller 130_s may receive the block of data and the associated system ECC code from the at least one processor 120 via the bus system 115. The system ECC decoder 131 may utilize the system ECC code to detect and/or correct error or errors in the block of data.

The memory 150_s may be configured to support the system ECC function. Since the apparatus 100_s utilizes the memory 150_s for the system ECC function, the system ECC memory 137 (FIG. 2) would not be required. The memory 150_s may include a memory array 175_s configured to store data, array ECCs, and system ECCs. For example, a block of data may share a same address with an array ECC and/or a system ECC. The block of data and the array ECC or the system ECC may be accessed (read or written) using the same address. The memory 150_s may further include a mode register 179 configured to indicate (e.g., to the host 110_s) that the memory 150_s is configured to support the system ECC function.

The apparatus 100_s is further configured to utilize the memory 150_s to implement the system ECC function. In some examples, a system ECC function may support end-to-end ECC function. For example, the system ECC function may be implemented for data from the at least one processor 120 to the memory 150_s and/or data from the memory 150_s to the at least one processor 120. In some examples, the host 110_s may provide or receive the system ECC codes from the memory 150_s via signal connections of the channel 190_s, the signal connections being shared with link ECC functions.

The apparatus 100_s may support the ECC function and a link ECC function (e.g., at different times or different operations). The memory I/O module 160 may optionally include the memory link ECC decoder 161 and the memory link ECC encoder 162 (see FIG. 2). The controller PHY modules 134_s may optionally include the link ECC decoder 135 and the link ECC encoder 136. The link ECC function may utilize the data mask DM signal connection to transport a link ECC, from the memory 150_s to the host 110_s, in a read operation and the read strobe RDQS_t signal connection to transport the link ECC, from the host 110_s to the memory 150_s, in a read operation.

Figure 4:
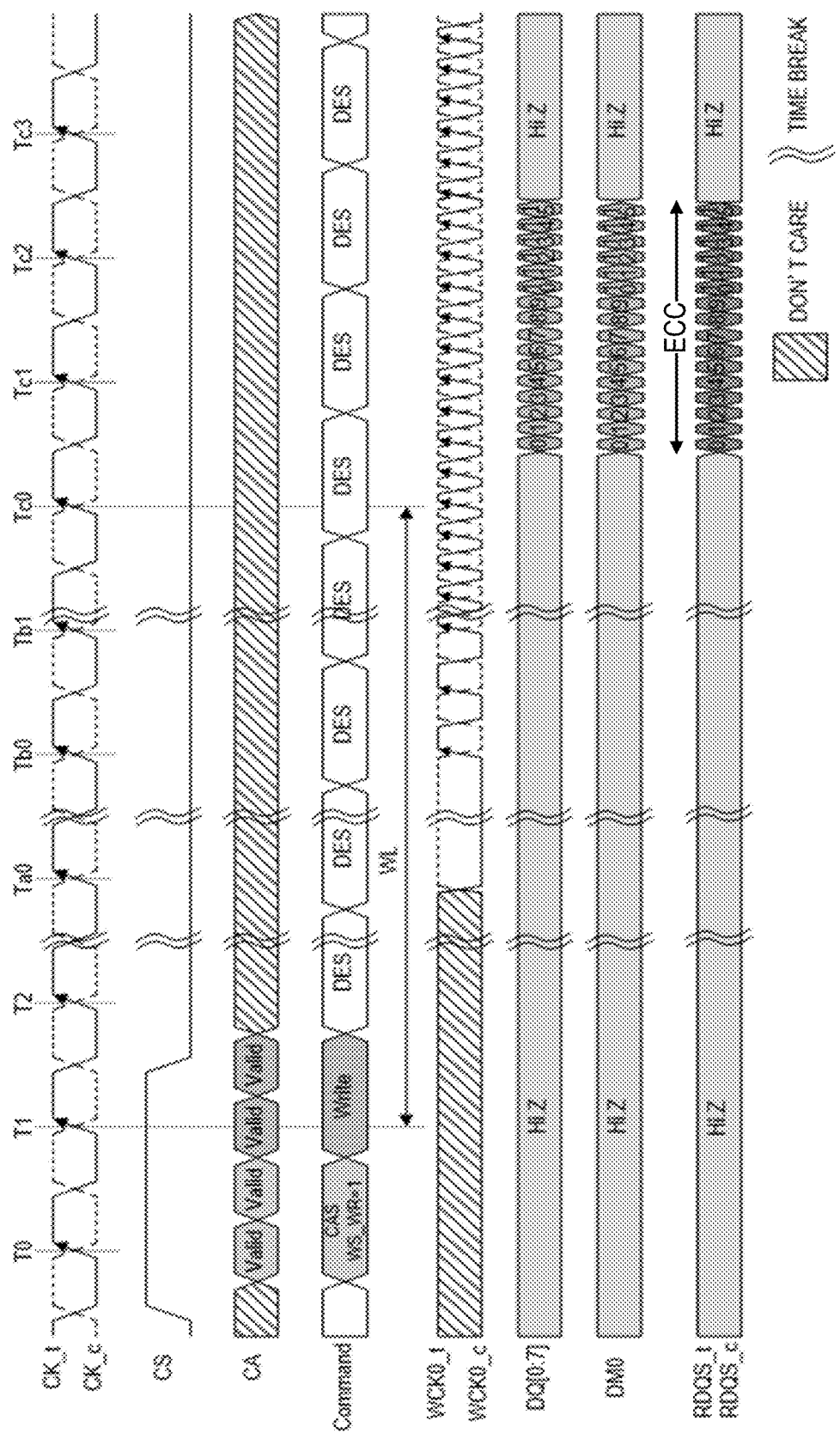
FIG. 4 illustrates waveforms of a system ECC function of the apparatus of FIG. 3 in a write operation, in accordance with certain aspects of the present disclosure.

FIG. 4 illustrates waveforms of a system ECC function of the apparatus 100_s of FIG. 3 in a write operation, in accordance with certain aspects of the present disclosure. The command and address clock, CK, may be a differential signal having CK_t and CK_c signal connections. The data clock WCK may be a differential signal having WCK0_t and WCK0_c signal connections. The read data strobe RDQS may be a differential signal having RDQS_t and RDQS_c signal connections. The data mask is labeled DM0 to indicate that DM0 corresponds to a lower byte of DQs (DQ[0:7]). At T0 (rising edge of CK_c and falling edge of CK_t), a CAS command may be provided by the host 110_s for a write operation to the memory 150_s. At T1, a write command may be provided by the host 110_s to the memory 150_s.

After a time period write latency (WL), the host 110_s may toggle the data clock WCK0_t and WCK0_c to provide the memory 150_s with clocking for receiving data for write, on the DQ signal connections. At Tc0-Tc2, the memory 150_s may receive 16 bits of data serially, on each of the DQ[0:7] signal connections and clocked by the data clock WCK0_t and WCK0_c. The memory 150_s may receive 16 bits of the data mask DM0 serially (e.g., based on the data clock WCK0_t and WCK0_c) to mask certain portions of the received data from the write operation. In some examples, the 16 bytes of data and 16 bits of the data mask DM0 may be received by the memory 150_s, with each bit of the data mask DM0 masking a corresponding byte of the received data.

At Tc0-Tc2, the memory 150_s may receive, for example, 16 bits of ECC on the RDQS_t signal connection, based on the data clock WCK0_t and WCK0_c. In a read operation, the RDQS_t signal connection may be configured to provide a read data strobe (RDQS) from the memory 150_s to the host 110_s. In some examples, the ECC received by the memory 150_s may be link ECC. Referring to FIG. 3, the memory link ECC decoder 161 may utilize the received the 16 bits of ECC to detect and/or correct errors in the received 16 bytes of data. As link ECC, the received 16 bits of ECC might not be stored in the memory array 175_s (see FIG. 3).

In some examples, the received ECC might be system ECC. The apparatus 100_s may be configured to operate the link ECC function and the system ECC function at different times/configurations, via shared signal connections (e.g., the data mask DM and/or the read data strobe RDQS). Moreover, the apparatus 100_s may be further configured to perform an array ECC function. Referring to FIG. 3, the memory 150_s may be configured to provide the 16 bytes of data and the 16 bits of system ECC to the array ECC encoder 172, via the node 163. The array ECC encoder 172 may be configured to generate an array ECC based on the 16 bytes of data and/or the 16 bits of system ECC and provide the data, the system ECC, and the array ECC to the memory array 175_s for storage (via the node 173). The memory array 175_s may be configured to store (e.g., write into) the received data, the received system ECC, and the array ECC from the array ECC encoder 172.

Figure 5:
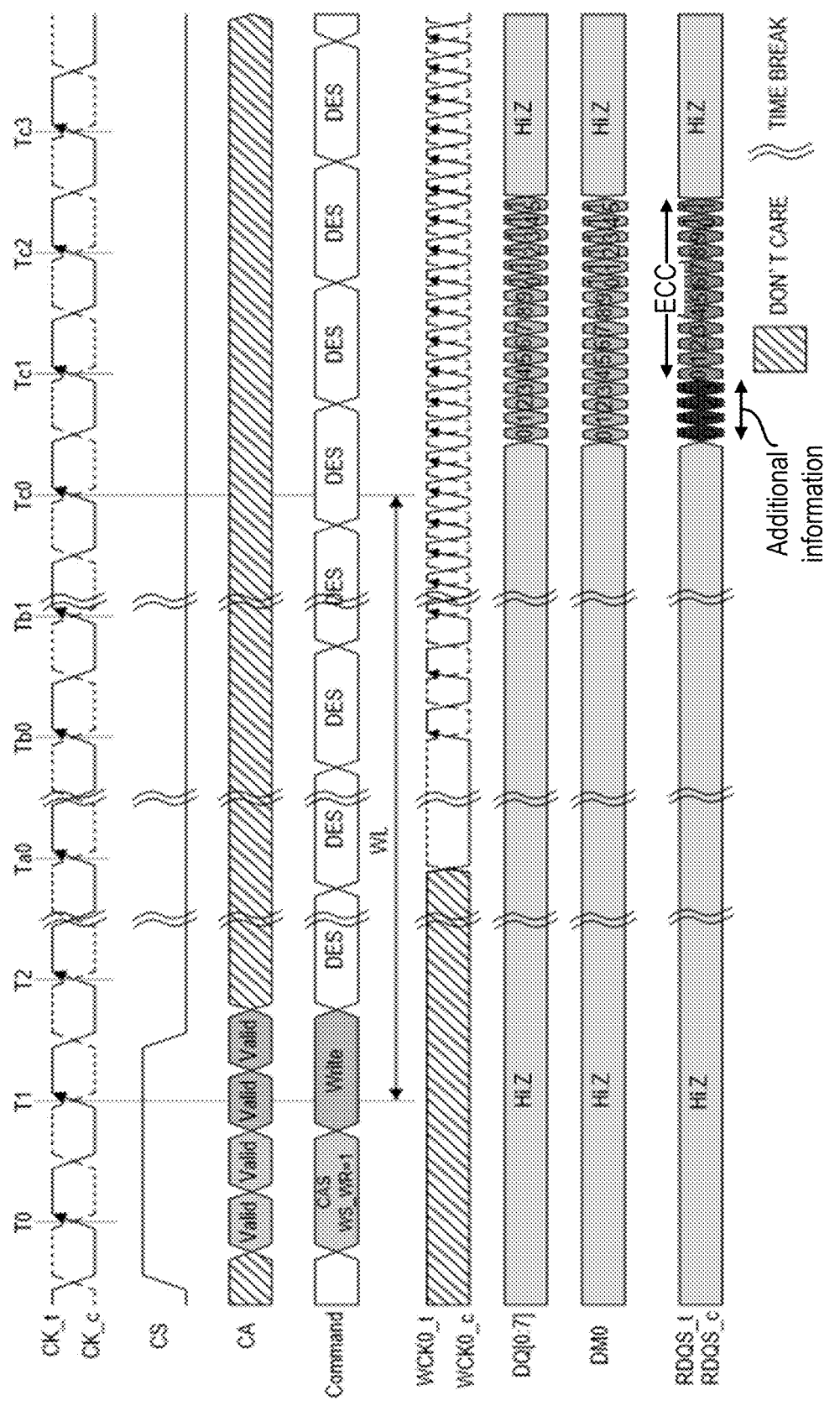
FIG. 5 illustrates waveforms of another system ECC function of the apparatus of FIG. 3 in a write operation, in accordance with certain aspects of the present disclosure.

FIG. 5 illustrates waveforms of another system ECC function of the apparatus 100_s of FIG. 3 in a write operation, in accordance with certain aspects of the present disclosure. In some examples, different ECC encoding/decoding protocols may require fewer bits of ECCs for the 16 bytes of data in the write operation. In this example, 12 bits of ECC are provided to the memory 150_s via the signal connection of the read data strobe RDQS_t. Further, the host 110_s may be configured to provide 4 bits of additional data information of the data in the write operation on the signal connection of the read data strobe RDQS_t. For example, the additional data information may indicate types of the data for write or usage information (e.g., data attributes, cacheable or not cacheable, etc.).

Figure 6:
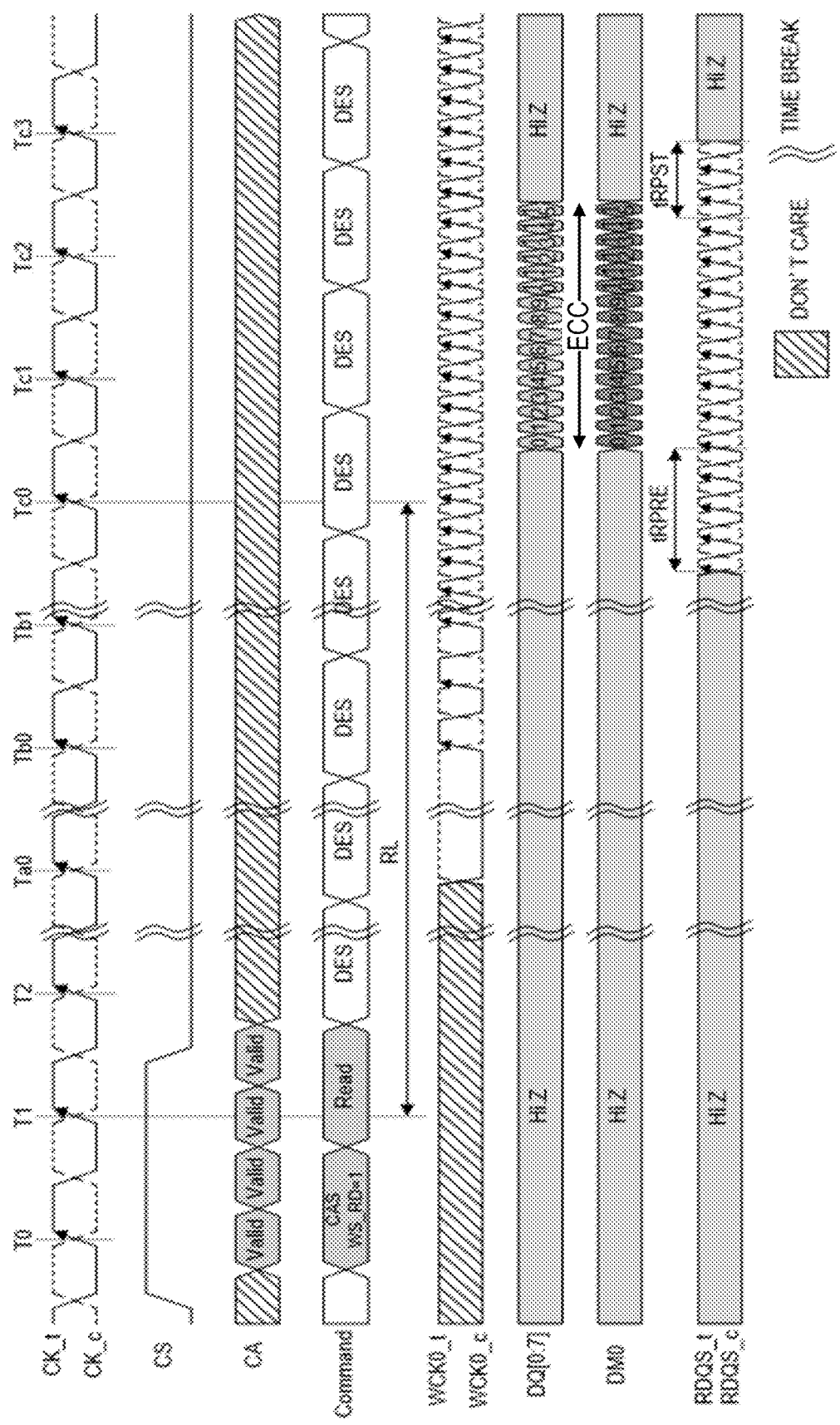
FIG. 6 illustrates waveforms of the system ECC function of the apparatus of FIG. 3 in a read operation, in accordance with certain aspects of the present disclosure.

FIG. 6 illustrates waveforms of the system ECC function of the apparatus 100_s of FIG. 3 in a read operation, in accordance with certain aspects of the present disclosure. The command and address clock, CK, may be a differential signal having CK_t and CK_c signal connections. The data clock WCK may be a differential signal having WCK0_t and WCK0_c signal connections. The read data strobe RDQS may be a differential signal having RDQS_t and RDQS_c signal connections. The data mask is labeled DM0 to indicate that DM0 corresponds to a lower byte of DQs (DQ[0:7]). At T0 (rising edge of CK_c and falling edge of CK_t), a CAS command may be provided by the host 110_s for a read operation to the memory 150_s. At T1, a read command may be provided by the host 110_s to the memory 150_s.

After a time period read latency (RL), the memory 150_s may toggle the read data strobe RDQS to provide the host 110_s with clocking to receive data for the read operation, on the DQ signal connections. At Tc0-Tc2, the host 110_s may receive 16 bits of data serially, on each of the DQ[0:7]

signal connections and clocked by the read data strobe RDQS_t and RDQS_c. Thus, in the example, 16 bytes of data are received by the host 110.

At Tc0-Tc2, the host 110_s may receive, for example, 16 bits of ECC on the data mask DM0 signal connection, based on (e.g., clocked by) the read data strobe RDQS_t and RDQS_c. In a write operation, the DM signal connection may be configured to provide a data mask from the host 110_s to the memory 150_s. In some examples, the ECC received by the host 110_s may be a link ECC. Referring to FIG. 3, the memory link ECC encoder 162 may generate the 16 bits of link ECC based on the 16 bytes of data stored in memory array 175_s (and provided to the host 110_s in the read operation). As link ECC, the 16 bits of ECC might not stored in the memory array 175_s (see FIG. 3).

In some examples, the ECC received by the host 110_s may be a system ECC. The apparatus 100 may be configured to operate the link ECC and the system ECC at different times/configurations, via shared signal connections (e.g., the data mask DM and/or the read data strobe RDQS). Referring to FIG. 3, the memory 150_s may be configured to provide the 16 bytes of data, associated array ECC, and associated system ECC (all stored in the memory array 175_s) to the array ECC decoder 171, via the node 174. The array ECC decoder 171 may be configured to detect/correct errors in the 16 bytes of data and/or the system ECC, based on the array ECC. The array ECC decoder 171 may be configured to output the corrected 16 bytes of data and/or the system ECC to the memory I/O module 160 and to the host 110_s in the read operation.

Figure 7:
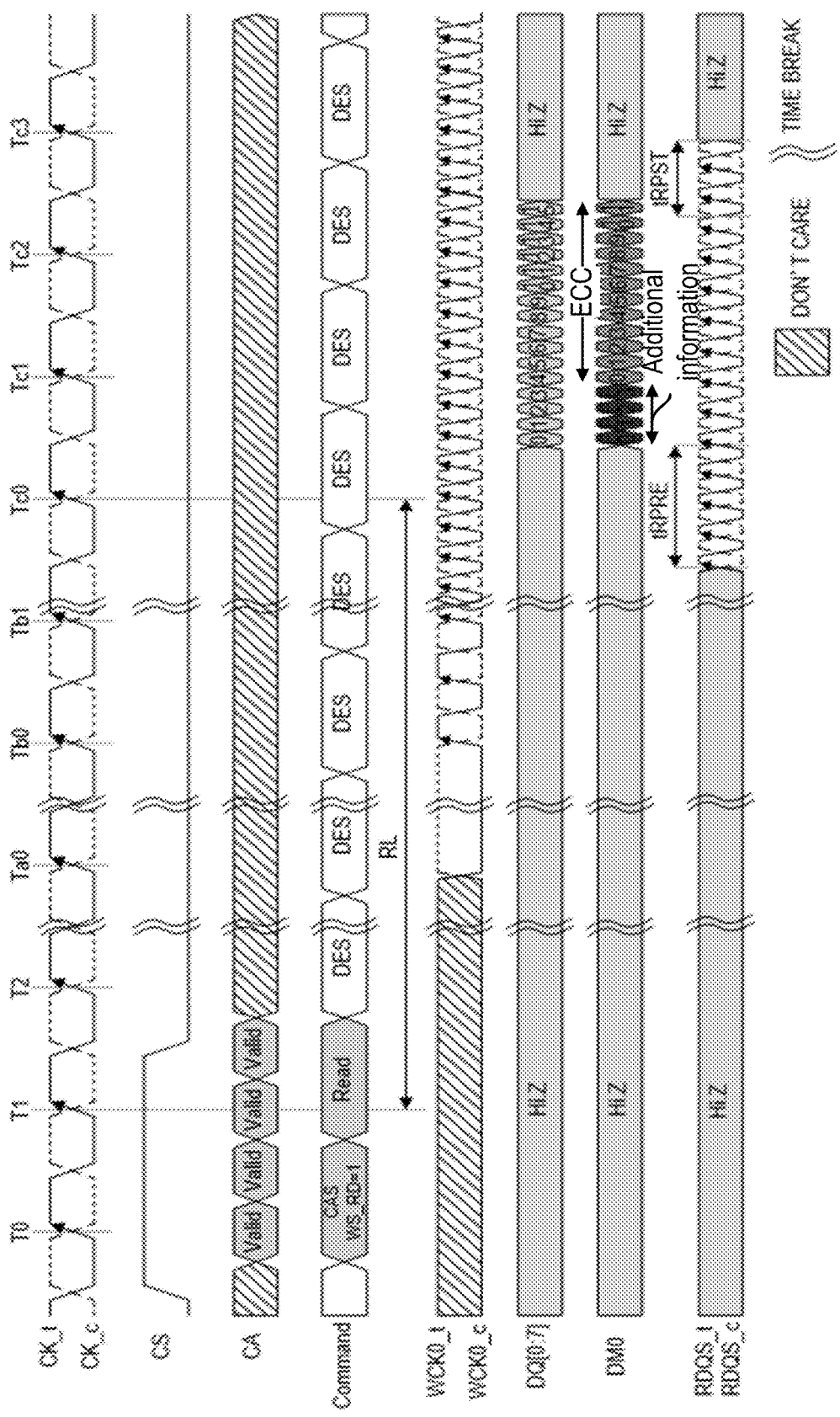
FIG. 7 illustrates waveforms of another system ECC function of the apparatus of FIG. 3 in a read operation, in accordance with certain aspects of the present disclosure.

FIG. 7 illustrates waveforms of another system ECC function of the apparatus 100_s of FIG. 3 in a read operation, in accordance with certain aspects of the present disclosure. In some examples, different ECC encoding/decoding protocols may require fewer bits for the 16 bytes of data outputted by the memory 150_s in the read operation. In this example, 12 bits of ECC are provided to the host 110_s via the signal connection of the data mask DM. Further, the memory 150_s may be configured to provide 4 bits of additional data information on the signal connection of the data mask DM0. For example, the additional data information may indicate types of the data for write or usage information (e.g., cacheable or not cacheable). For example, the additional information may be provided by the host 110_s and associated with the data in the read operation and stored in the memory 150_s, prior to the read operation.

In some examples, the additional information may include additional ECC information. The additional ECC information may be based on, for example, an array ECC or information on the array ECC. For example, the additional ECC information may indicate a number of times the data in the read operation has been corrected by the array ECC or includes errors not corrected by the array ECC. In some examples, the host_110 may utilize the additional ECC information and the system ECC to further detect/correct errors in the data received in the read operation, instead of using system ECC alone.

Figure 8:
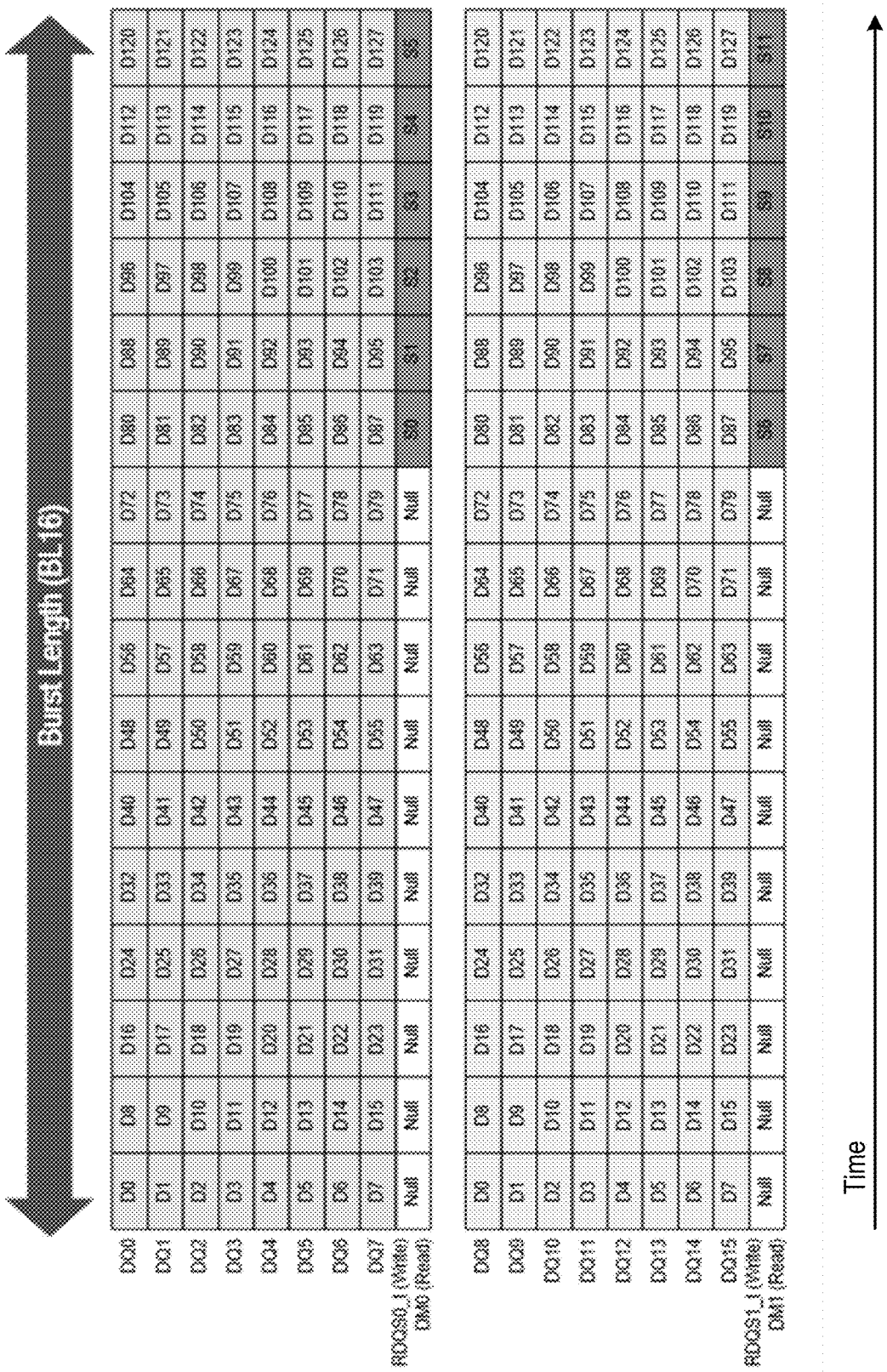
FIG. 8 illustrates data structures of another embodiment of the apparatus of FIG. 3, in accordance with certain aspects of the present disclosure.

FIG. 8 illustrates data read or written of another embodiment of the apparatus 100_s of FIG. 3, in accordance with certain aspects of the present disclosure. In some examples, the channel 190_s may be ×16 (two bytes of DQs; FIG. 3 illustrates only a lower byte of DQs for clarity). FIG. 8 illustrates a read/write of burst length 16. Thus, a total of 32 bytes of data are read or written in the figure. A corresponding data mask DM (DM0 and DM1) and read data strobe RDQS_t (RDQS0_t and RDQS1_t) may be provided for each byte of DQs. For example, a data mask DM0 may be provided for DQ[0:7], and a data mask DM1 may be provided for DQ[8:15] to mask certain portions of write data in a write operation. A read data strobe RDQS0_t may be provided for DQ[0:7], and a read data strobe RDQS1_t may be provided for DQ[8:15] to provide clocking of read data in a read operation.

In some examples, the system ECC function may be implemented and/or distributed over the byte boundary, in order to improve floor planning in the memory 150_s. For example, in some ECC functions, a 12-bit ECC might be sufficient for the 32 bytes of data read or written. The 12 bits of ECC may be transferred by the data mask DM0 and DM1 in a read operation (provided by the memory 150_s to the host 110_s) and transferred by the read data strobe RDQS0_t and RDQS1_t in a write operation (provided by the host 110_s to the memory 150_s). As illustrated in FIG. 8, 6 bits of the ECC may be transferred in the first 6 cycles of the burst for each byte of data read or written. For the remaining 10 cycles, the data mask DM0 and DM1 and/or the read data strobe RDQS0_t and RDQS1_t may be utilized to transfer additional information, such as additional ECC information and/or additional data information (see FIGS. 5 and 7).

FIG. 9 illustrates an embodiment of the mode register 179 of the apparatus 100_s of FIG. 3, in accordance with certain aspects of the present disclosure. As illustrated at 910, the mode register 179 may include 8 bits operands OP[7:0], among which OP[7:4] may be reserved. OP[3:0] may indicate System ECC Support and Configuration (SESC). As illustrated at 920, the mode register 179 may be read only. For example, the memory 150_s (e.g., by a manufacturer thereof) may set the mode register 179 regarding SESC, independent of the host 110_s. The host 110_s may be configured to read the mode register 179 to learn, for example, whether the memory 150_s supports the system ECC, sizes of the system ECCs, and/or additional information transferred in the system ECC (see FIGS. 5 and 7). However, the host 110_s might not write into the mode register 179.

For example, the mode register 179 may indicate whether the system ECC is supported. For example, OP[3:0] at 0000 may indicate that the system ECC is not support. OP[3:0] may further indicate a size of the system ECC and a size of the additional information (e.g., on per number of DQs and/or per number of burst lengths basis). For example, OP[3:0] at 0010 may indicate 24 bits of ECC and 8 bits of additional information, per ×16 channel and burst length (BL) of 16. The additional information may be additional data information and/or additional ECC information. For example, the additional ECC information may be array ECC decode information (AED). For example, the AED may be an array ECC of read or write data and/or a system ECC thereof. In some examples, the AED may be information related to the array ECC function, such as a number of times the read or write data has been corrected by the array ECC function or whether the read or right data include errors not corrected by the array ECC function.

Figure 10:
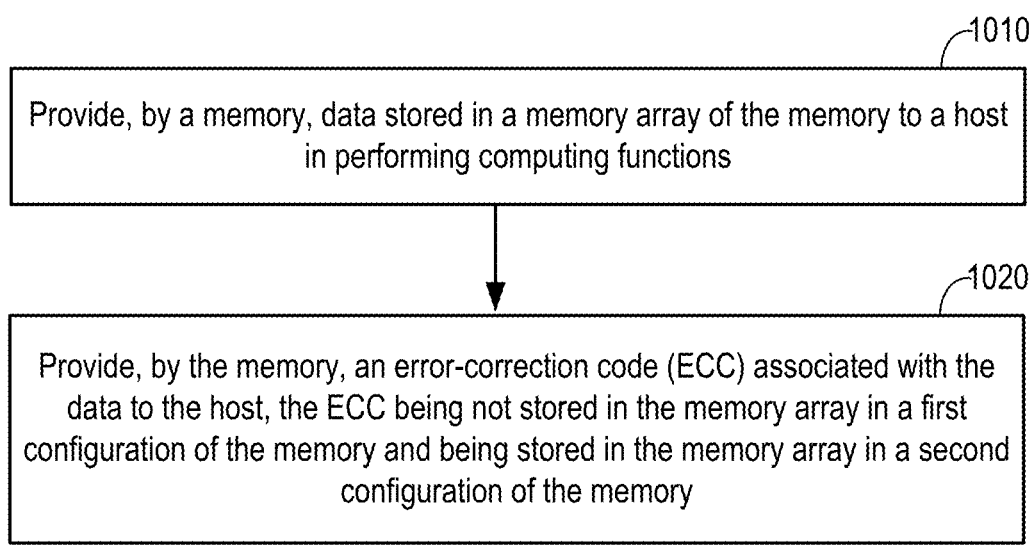
FIG. 10 illustrates a method to operate a system ECC function for the apparatus of FIG. 3, in accordance with certain aspects of the disclosure.

FIG. 10 illustrates a method to operate system ECC function for the apparatus 100_s of FIG. 3, in accordance with certain aspects of the disclosure. The operations of FIG. 10 may be implemented by, for example, the apparatus 100 or 100_s presented with FIGS. 1 and 3-9. The arrows indicate certain relationships among the operations, but not necessarily sequential relationships. At 1010, data stored in a memory array of a memory are provided by the memory to a host in performing computing functions. At 1020, an error-correction code (ECC) associated with the data is provided by the memory to the host, the ECC being not stored in the memory array in a first configuration of the memory and being stored in the memory array in a second configuration of the memory.

For example, the apparatus 100_s may include the memory 150_s configured to communicate with the host 110_s. The memory 150_s may include the memory array 175_s, the memory array 175_s being configured to store data (e.g., read data provided to the host 110_s or write data received from the host 110_s). The memory 150_s may be configured to provide the data stored in the memory array 175_s to the host 110_s in performing various computing functions and configured to provide an error-correction code (ECC) associated with the data to the host 110_s. The ECC might not be stored in the memory array in a first configuration of the memory 150_s (e.g., the memory 150_s being configured for the link ECC function) and might be stored in the memory array 175_s in a second configuration of the memory (e.g., the memory 150_s being configured for the system ECC function).

The first configuration and the second configuration of the memory 150_s may be based on at least one mode register 179 of the memory 150_s, the at least one mode register being accessible separately from the memory array 175_s. For example, the at least one mode register 179 may indicate that the memory 150_s supports or enables the second configuration (e.g., the system ECC function). Moreover, the at least one mode register 179 may be accessed separately from the memory array 175_s. For example, the at least one mode register 179 may be read (or written) by a mode register read (or mode register write) command not shared with commands to read or write the memory array 175_s.

The memory 150_s may be further configured to provide the ECC (e.g., a link ECC or a system ECC) to the host 110_s for the first configuration and for the second configuration via a read ECC signal connection. For example, the read ECC signal connection may include the data mask DM configured to provide a data mask from the host 110_s to the memory 150_s in a write operation. In some examples, the first configuration may include a link ECC function, and the second configuration includes a system ECC function.

The at least one mode register 179 may configurable to indicate the second configuration is enabled (see FIG. 9). For example, the memory 150_s may configure the at least one mode register 179 to indicate that the system ECC is enabled/supported. The at least one mode register 179 may be further configured (e.g., by the memory 150_s) to indicate a size of the ECC in the second configuration. The at least one mode register 179 may be further configurable to indicate the memory 150_s to provide additional ECC information or additional data information associated with the data (read data or write data) via the read ECC signal connection.

The additional ECC information may be based on an array ECC (the array ECC may be stored in the memory array 175_s; see FIG. 3). The memory 150_s may be further configured to generate the array ECC based on the data (e.g., read data) before storing the data in the memory array 175_s (e.g., by the array ECC encoder 172). The memory 150_s may be further configured to detect or correct error in the data (e.g., read data) stored in the memory array 175_s based on the array ECC (e.g., by the array ECC decoder 171). In some examples, the at least one mode register 179 may be readable but not writable by the host 110_s (see FIG. 9).

Figure 11:
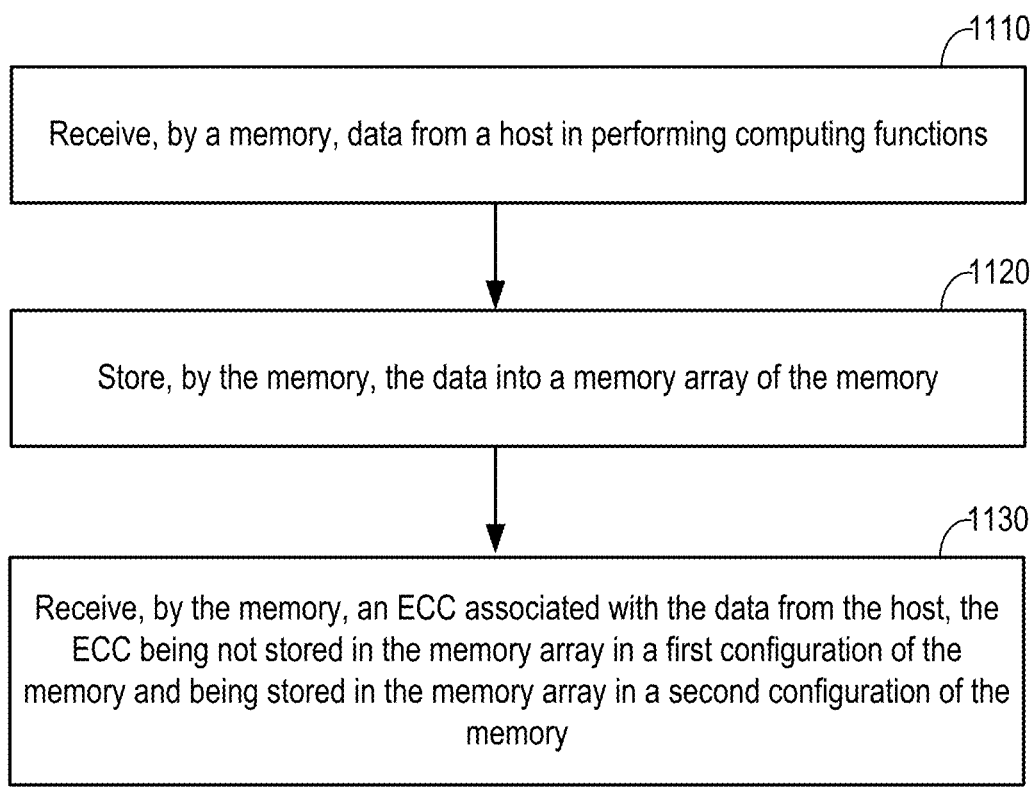
FIG. 11 illustrates another method to operate a system ECC function for the apparatus of FIG. 3, in accordance with certain aspects of the disclosure.

FIG. 11 illustrates another method to operate a system ECC function for the apparatus 100_s of FIG. 3, in accordance with certain aspects of the disclosure. The operations of FIG. 11 may be implemented by, for example, the apparatus 100 or 100_s presented with FIGS. 1 and 3-9. The arrows indicate certain relationships among the operations, but not necessarily sequential relationships. At 1110, data are received from a host by a memory in performing computing functions. At 1120, the data are stored by the memory into a memory array. At 1130, an ECC associated with the data from the host is received by the memory, the ECC being not stored in the memory array in a first configuration of the memory and being stored in the memory array in a second configuration of the memory.

For example, the memory 150_s may be configured to receive the data (e.g., write data) from the host 110_s in performing computing functions, to store or write the data into the memory array, and to receive the ECC (e.g., link ECC or system ECC) from the host 110_s. The memory may be further configured to receive the ECC from the host 110_s for the first configuration (e.g., configuration for supporting or implement the link ECC function) and for the second configuration (e.g., configuration for supporting or implement the system ECC function) via a write ECC signal connection (e.g., read data strobe RDQS). The write ECC signal connection may be further configured to provide a data strobe from the memory 150_s to the host 110_s in a read operation.

The apparatus of claim 14, the at least one mode register 179 may be configurable to indicate a size of the ECC in the second configuration. The at least one mode register 179 may be further configurable to indicate the memory 150_s to provide additional ECC information associated with the data (e.g., read data) in the read operation via the read ECC signal connection (e.g., data mask DM) or to receive additional data information associated with the data (e.g., write data) in the write operation via the write ECC signal connection (e.g., read data strobe RDQS).

The additional ECC information provided by the memory 150_s may be based on an array ECC. The array ECC may be stored in the memory array 175_s. The memory 150_s may be further configured to generate the array ECC based on the data (e.g., received write data) before storing the data in the memory array 175_s and to detect or correct error in the data (e.g., read data) stored in the memory array based on the array ECC. In some examples, the at least one mode register 179 may be readable but not writable by the host 110_s.

For example, the memory 150_s may be configured to communicate with the host 110_s. The memory 150_s may include the memory array 175_s configured to store data. The memory 150 may be further configured to receive data (e.g., write data) from the host 110_s in performing computing functions, to write the data into the memory array 175_s, and to receive an ECC (e.g., link ECC or system ECC) associated with the data from the host 110_s. The ECC might not be stored in the memory array 175_s in a first configuration of the memory 150_s (e.g., configuration for supporting or implement the link ECC function) and might be stored in the memory array 175_s in a second configuration of the memory 150_s (e.g., configuration for supporting or implement the system ECC function). The first configuration and the second configuration may be based on at least one mode register 179 of the memory 150_s, the at least one mode register 179 might be accessible separately from the memory array 175_s.

The memory 150_s may be further configured to receive the ECC from the host 110_s for the first configuration and for the second configuration via a write ECC signal connection (e.g., read data strobe RDQS). The write ECC signal connection may be configured to provide a data strobe from the memory 150_s to the host 110_s in a read operation. The first configuration may include a link ECC. The second configuration may include a system ECC.

The at least one mode register 179 may be configurable to indicate the second configuration being enabled (see FIG. 9). The at least one mode register may be configurable to indicate a size of the ECC. The at least one mode register 179 may be readable but not writable by the host 110_s. The at least one mode register may be further configurable to indicate the memory 150_s to receive additional data information associated with the data via the write ECC signal connection.

Figure 12:
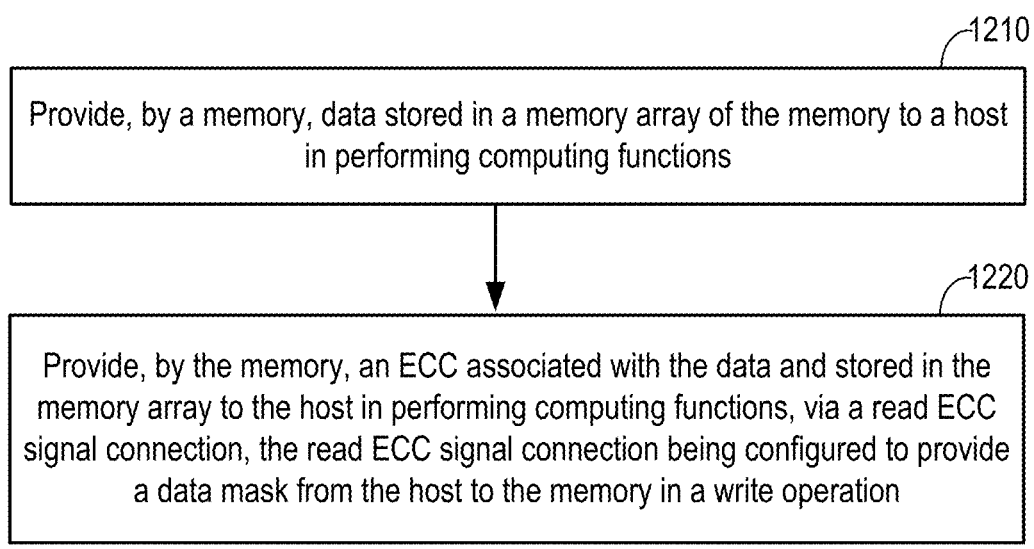
FIG. 12 illustrates another method to operate a system ECC function for the apparatus of FIG. 3, in accordance with certain aspects of the disclosure.

FIG. 12 illustrates another method to operate a system ECC function for the apparatus 100_s of FIG. 3, in accordance with certain aspects of the disclosure. The operations of FIG. 12 may be implemented by, for example, the apparatus 100 or 100_s presented with FIGS. 1 and 3-9. The arrows indicate certain relationships among the operations, but not necessarily sequential relationships. At 1210, data stored in a memory array of a memory are provided by the memory to a host in performing computing functions. At 1220, an ECC associated with the data and stored in the memory array is provided by the memory to the host in performing computing functions, via a read ECC signal connection. The read ECC signal connection is configured to provide a data mask from the host to the memory in a write operation.

For example, the memory 150_s may include the memory array 175_s configured to store data and an ECC associated with the data. The memory 150_s may be configured to provide the data (e.g., read data) and the ECC stored in the memory array 175_s to the host 110_s in performing computing functions, via a read ECC signal connection (e.g., data mask DM). The read ECC signal connection may be configured to provide a data mask from the host 110_s to the memory 150_s in a write operation. The at least one mode register 179 may be configurable to indicate enabling providing the ECC stored in the memory 150_s to the host 110_s via the read ECC signal connection. The at least one mode register 179 may be further configurable to indicate the memory 150_s to provide additional ECC information via the read ECC signal connection.

Figure 13:
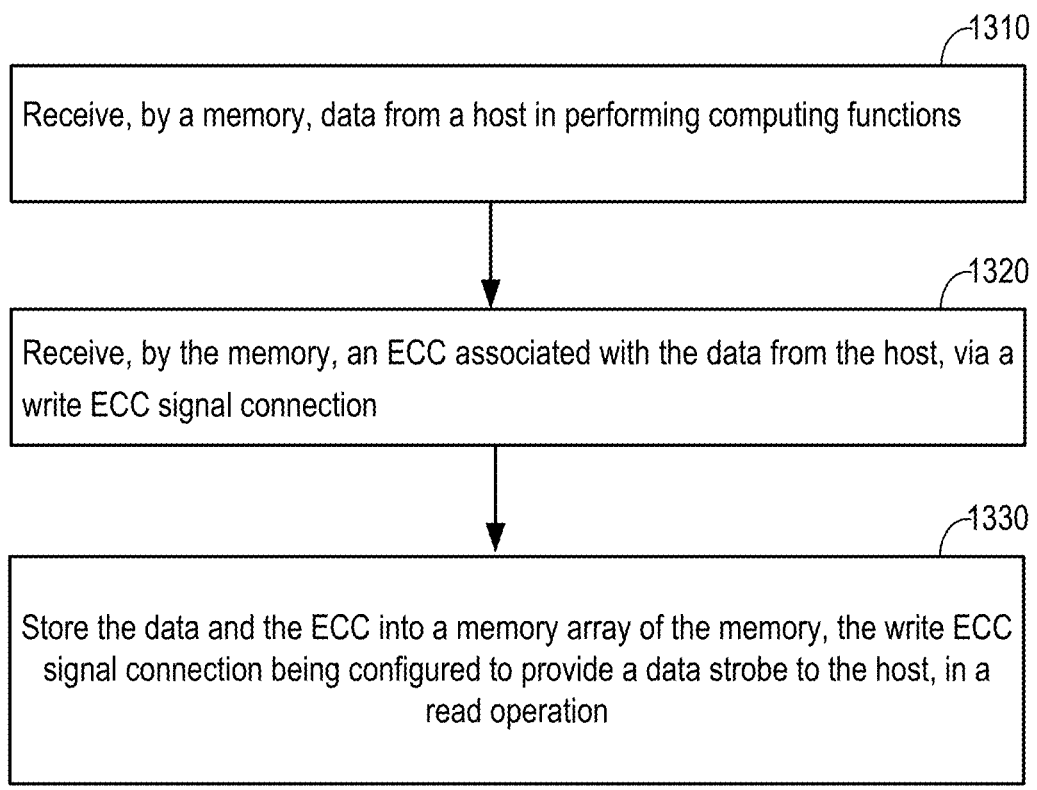
FIG. 13 illustrates another method to operate a system ECC function for the apparatus of FIG. 3, in accordance with certain aspects of the disclosure.

FIG. 13 illustrates another method to operate a system ECC function for the apparatus 100_s of FIG. 3, in accordance with certain aspects of the disclosure. The operations of FIG. 13 may be implemented by, for example, the apparatus 100 or 100_s presented with FIGS. 1 and 3-9. The arrows indicate certain relationships among the operations, but not necessarily sequential relationships. At 1310, data are received by a memory from a host in performing computing functions. At 1320, an ECC associated with the data is received from the host, via a write ECC signal connection. At 1330, the data and the ECC are stored into a memory array of the memory, the write ECC signal connection being configured to provide a data strobe to the host, in a read operation.

For example, the memory 150_s may be further configured to receive the data (e.g., write data) and the ECC from the host 110_s in performing computing functions, via a write ECC signal connection (e.g., read data strobe RDQS) and to store the data and the ECC into the memory array 175_s. The write ECC signal connection may be configured to provide a data strobe from the memory 150_s to the host 110_s in a read operation. The at least one mode register may further configurable to indicate the memory 150_s to provide additional ECC or data information associated with the data in the read operation via the read ECC signal connection or to receive additional ECC or data information associated with the data in the write operation via the write ECC signal connection.

Figure 14:
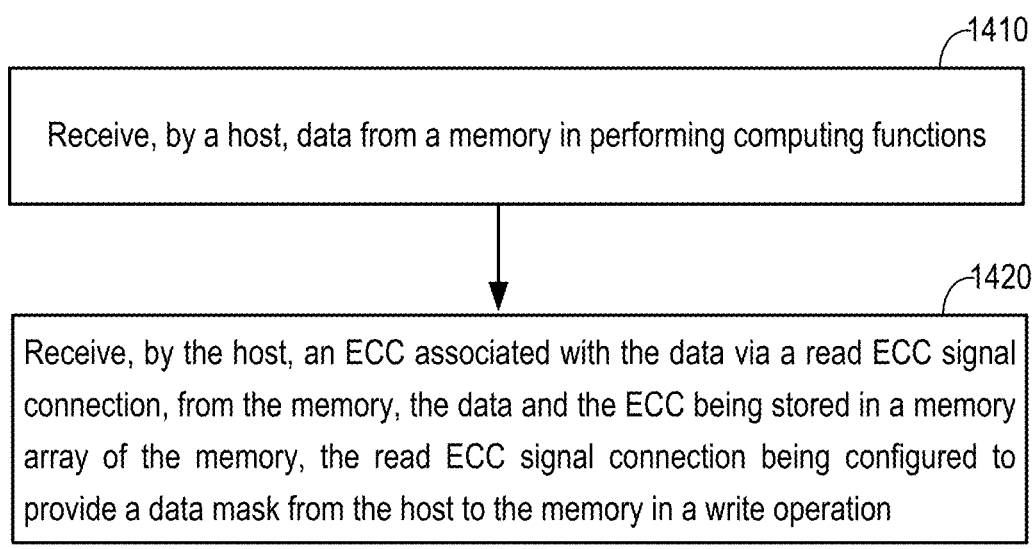
FIG. 14 illustrates another method to operate a system ECC function for the apparatus of FIG. 3, in accordance with certain aspects of the disclosure.

FIG. 14 illustrates another method to operate a system ECC function for the apparatus 100_s of FIG. 3, in accordance with certain aspects of the disclosure. The operations of FIG. 14 may be implemented by, for example, the apparatus 100 or 100_s presented with FIGS. 1 and 3-9. The arrows indicate certain relationships among the operations, but not necessarily sequential relationships. At 1410, data from a memory are received by a host in performing computing functions. At 1420, an ECC associated with the data is received by the host, via a read ECC signal connection, from the memory, the data and the ECC being stored in a memory array of the memory, the read ECC signal connection being configured to provide a data mask from the host to the memory in a write operation.

For example, the host 110_s may be configured to communicate with a memory 150_s. The host 110_s may be further configured to receive data in performing computing functions from the memory 150_s and to receive an ECC associated with the data, via a read ECC signal connection (data mask DM), from the memory 150_s. For example, in a system ECC function, the ECC associated with the data may be previously provided by the host 110_s along with the data and stored in the memory array 175_s. The data and the associated ECC may share a common address in the memory array 175_s. In a link ECC function, the ECC associated with the data may be generated by the memory link ECC encoder 162 (FIG. 3) based on the data stored in the memory array 175_s. The data and the ECC being stored in a memory array 175_s of the memory 150_s. The read ECC signal connection may be configured to provide a data mask from the host 110_s to the memory 150_s in a write operation.

The host 110_s may be further configured to read from the at least one mode register 179 in the memory 150_s. The at least one mode register 179 may be accessible separately from the memory array 175_s and may be configurable to indicate the memory 150_s being enabled to provide the ECC stored in the memory array 175_s via the read ECC signal connection. The at least one mode register 179 may be further configurable to indicate a size of the ECC. The host 110 may be further configured to provide the data and to provide the ECC via a write ECC signal connection (e.g., read data strobe RDQS) to the memory 150_s in performing computing functions. The write ECC signal connection may be configured to provide a data strobe from the memory 150_s to the host 110_s in a read operation.

Figure 15:
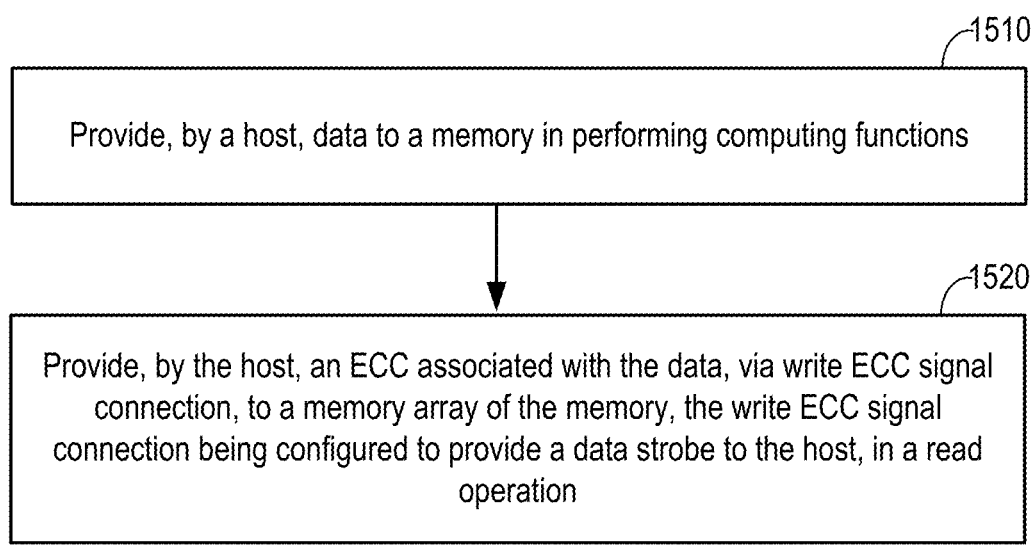
FIG. 15 illustrates another method to operate a system ECC function for the apparatus of FIG. 3, in accordance with certain aspects of the disclosure.

FIG. 15 illustrates another method to operate a system ECC function for the apparatus 100_s of FIG. 3, in accordance with certain aspects of the disclosure. The operations of FIG. 15 may be implemented by, for example, the apparatus 100 or 100_s presented with FIGS. 1 and 3-9. The arrows indicate certain relationships among the operations, but not necessarily sequential relationships. At 1510, data are provided by a host to a memory in performing computing functions. At 1520, an ECC associated with the data is provided by the host, via write ECC signal connection, to a memory array of the memory, the write ECC signal connection being configured to provide a data strobe to the host, in a read operation.

For example, the host 110_s may be further configured to provide data (e.g., write data) in performing computing functions and to provide an ECC associated with the data, via the write ECC signal connection (e.g., read data strobe RDQS), to the memory array 175_s of the memory 150_s. For example, in a link ECC function, the ECC may be generated by the link ECC encoder 136 (FIG. 3), based on the data. In a system ECC function, the ECC may be generated by the system ECC encoder 132 (FIG. 3), based on the data. The write ECC signal connection may be configured to provide a data strobe to the host, in a read operation.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. An apparatus, comprising:
a memory device configured to communicate with a host, the memory device comprising a memory array configured to store first data,
the memory device being configured to provide the first data stored in the memory array to the host in performing computing functions and configured to provide an error-correction code (ECC) associated with the first data to the host,
the ECC being not stored in the memory array in a first configuration of the memory device and being stored in the memory array in a second configuration of the memory device.

2. The apparatus of claim 1, the first configuration and the second configuration being based on at least one mode register of the memory device, the at least one mode register being accessible separately from the memory array.

3. The apparatus of claim 2, the memory device being further configured to provide the ECC to the host for the first configuration and for the second configuration via a read ECC signal connection.

4. The apparatus of claim 3, the read ECC signal connection being further configured to provide a data mask from the host to the memory device in a write operation.

5. The apparatus of claim 3, the at least one mode register being further configurable to indicate the memory device to provide additional ECC information associated with the first data via the read ECC signal connection.

6. The apparatus of claim 5,
the additional ECC information being based on an array ECC,
the array ECC being stored in the memory array,
the memory device being further configured to generate the array ECC based on the first data before storing the first data in the memory array and to detect or correct an error in the first data stored in the memory array based on the array ECC.

7. The apparatus of claim 3, further comprising a device selected from one of a computing system, a mobile computing system, an Internet of Things device, a virtual reality system, or an augmented reality system, the device incorporating the memory device, the host, and the read ECC signal connection.

8. The apparatus of claim 2, the at least one mode register being configurable to indicate the second configuration being enabled.

9. The apparatus of claim 2, the at least one mode register being configurable to indicate a size of the ECC.

10. The apparatus of claim 2, the at least one mode register being readable but not writable by the host.

11. The apparatus of claim 1, the first configuration comprising a link ECC function.

12. The apparatus of claim 1,
the memory device being further configured to
receive the first data from the host in performing computing functions,
store the first data into the memory array, and
receive the ECC from the host.

13. The apparatus of claim 12, the memory device being further configured to receive the ECC from the host for the first configuration and for the second configuration via a write ECC signal connection.

14. The apparatus of claim 13, the write ECC signal connection being further configured to provide a data strobe from the memory device to the host in a read operation.

15. The apparatus of claim 14, the at least one mode register being further configurable to indicate the memory device to provide additional ECC information associated with the first data in the read operation via a read ECC signal connection or to receive additional data information associated with the first data in a write operation via the write ECC signal connection.

16. The apparatus of claim 15,
the additional ECC information being based on an array ECC,
the array ECC being stored in the memory array,
the memory device being further configured to generate the array ECC based on the first data before storing the first data in the memory array and to detect or correct an error in the first data stored in the memory array based on the array ECC.

17. The apparatus of claim 13, further comprising a device selected from one of a computing system, a mobile computing system, an Internet of Things device, a virtual reality system, or an augmented reality system,
the device incorporating the memory device, the host, and the write ECC signal connection.

18. The apparatus of claim 1, the ECC being a system ECC.

19. An apparatus, comprising:
a memory device configured to communicate with a host,
the memory device comprising a memory array configured to store first data,
the memory device being configured to
receive the first data from the host in performing computing functions,
store the first data into the memory array, and
receive an ECC associated with the first data from the host,
the ECC being not stored in the memory array in a first configuration of the memory device and being stored in the memory array in a second configuration of the memory device.

20. The apparatus of claim 19, the first configuration and the second configuration being based on at least one mode register of the memory device, the at least one mode register being accessible separately from the memory array.

21. The apparatus of claim 20, the memory device being further configured to receive the ECC from the host for the first configuration and for the second configuration via a write ECC signal connection.

22. The apparatus of claim 21, the write ECC signal connection being further configured to provide a data strobe from the memory device to the host in a read operation.

23. The apparatus of claim 21, the at least one mode register being further configurable to indicate the memory device to receive additional data information associated with the first data via the write ECC signal connection.

24. The apparatus of claim 21, further comprising a device selected from one of a computing system, a mobile computing system, an Internet of Things device, a virtual reality system, or an augmented reality system,
the device incorporating the memory device, the host, and the write ECC signal connection.

25. The apparatus of claim 20, the at least one mode register being configurable to indicate the second configuration being enabled.

26. The apparatus of claim 20, the at least one mode register being configurable to indicate a size of the ECC.

27. The apparatus of claim 20, the at least one mode register being readable but not writable by the host.

28. The apparatus of claim 19, the first configuration comprising a link ECC function.

29. An apparatus, comprising:
a memory device configured to communicate with a host,
the memory device comprising a memory array configured to store first data and an ECC associated with the first data,
the memory device being configured to provide the first data and to provide the ECC stored in the memory array, via a read ECC signal connection, to the host in performing computing functions,
the read ECC signal connection being configured to provide a data mask from the host to the memory device in a write operation,
the memory device further comprising at least one mode register,
the at least one mode register being accessible separately from the memory array and being configurable to indicate enabling providing the ECC stored in the memory array to the host via the read ECC signal connection.

30. The apparatus of claim 29, the at least one mode register being further configurable to indicate a size of the ECC.

31. The apparatus of claim 29, the at least one mode register being further configurable to indicate the memory device to provide additional ECC information associated with the first data via the read ECC signal connection.

32. The apparatus of claim 31,
the additional ECC information being based on an array ECC,
the array ECC being stored in the memory array,
the memory device being further configured to generate the array ECC based on the first data before storing the first data in the memory array and to detect or correct an error in the first data stored in the memory array based on the array ECC.

33. The apparatus of claim 29, the at least one mode register being readable but not writable by the host.

34. The apparatus of claim 29, further comprising a device selected from one of a computing system, a mobile computing system, an Internet of Things device, a virtual reality system, or an augmented reality system,
the device incorporating the memory device, the host, and the read ECC signal connection.

35. The apparatus of claim 29,
the memory device being further configured to receive the first data and the ECC from the host in performing computing functions, via a write ECC signal connection and to store the first data and the ECC into the memory array,
the write ECC signal connection being configured to provide a data strobe from the memory device to the host in a read operation.

36. The apparatus of claim 35, the at least one mode register being further configurable to indicate the memory device to provide additional ECC information associated with the first data in the read operation via the read ECC signal connection or to receive additional data information associated with the first data in the write operation via the write ECC signal connection.

37. The apparatus of claim 36,
the additional ECC information being based on an array ECC,
the array ECC being stored in the memory array,
the memory device being further configured to generate the array ECC based on the first data before storing the first data in the memory array and to detect or correct an error in the first data stored in the memory array based on the array ECC.

38. The apparatus of claim 35, further comprising a device selected from one of a computing system, a mobile computing system, an Internet of Things device, a virtual reality system, or an augmented reality system,
the device incorporating the memory device, the host, the read ECC signal connection, and the write ECC signal connection.

39. An apparatus, comprising:
a memory device configured to communicate with a host,
the memory device comprising a memory array configured to store first data,
the memory device being configured to
receive the first data from the host in performing computing functions,
receive an ECC associated with the first data from the host, via a write ECC signal connection, and
store the first data and the ECC into the memory array, the write ECC signal connection being configured to
provide a data strobe from the memory device to the
host, in a read operation,
the memory device further comprising at least one
mode register,
the at least one mode register being accessible separately from the memory array and being configurable to indicate enabling receiving the ECC via the write ECC signal connection and writing the ECC into the memory array.

40. The apparatus of claim 39, the at least one mode register being further configurable to indicate a size of the ECC.

41. The apparatus of claim 39, the at least one mode register being further configurable to indicate the memory device to receive additional data information associated with the first data via the write ECC signal connection.

42. The apparatus of claim 39, further comprising a device selected from one of a computing system, a mobile computing system, an Internet of Things device, a virtual reality system, or an augmented reality system,
the device incorporating the memory device, the host, and the write ECC signal connection.

43. The apparatus of claim 39, the ECC being a system ECC.

44. The apparatus of claim 39, the memory device being an LPDDR5 memory device.

45. The apparatus of claim 39, wherein the ECC comprises parity bits.

46. An apparatus, comprising:
a host configured to communicate with a memory device,
the host being further configured to receive first data from the memory device in performing computing functions and to receive an ECC associated with the first data, via a read ECC signal connection, from the memory device,
the first data and the ECC being stored in a memory array of the memory device,
the read ECC signal connection being configured to provide a data mask from the host to the memory device in a write operation,
the host being further configured to read from at least one mode register in the memory device,
the at least one mode register being accessible separately from the memory array and being configurable to indicate the memory device being enabled to provide the ECC stored in the memory array via the read ECC signal connection.

47. The apparatus of claim 46, the at least one mode register being further configurable to indicate a size of the ECC.

48. The apparatus of claim 46, the at least one mode register being further configurable to indicate the host to receive additional ECC information associated with the first data from the memory device, via the read ECC signal connection.

49. The apparatus of claim 48,
the additional ECC information being based on an array ECC,
the array ECC being stored in the memory array,
the memory device being further configured to generate the array ECC based on the first data before storing the first data in the memory array and to detect or correct an error in the first data stored in the memory array based on the array ECC.

50. The apparatus of claim 46, the at least one mode register being readable but not writable by the host.

51. The apparatus of claim 46, further comprising a device selected from one of a computing system, a mobile computing system, an Internet of Things device, a virtual reality system, or an augmented reality system,
the device incorporating the host, the memory device, and the read ECC signal connection.

52. The apparatus of claim 46,
the host being further configured to provide the first data and the ECC to the memory device in performing computing functions, via a write ECC signal connection,
the write ECC signal connection being configured to provide a data strobe from the memory device to the host in a read operation.

53. The apparatus of claim 52, the at least one mode register being further configurable to indicate the host to receive additional ECC information associated with the first data in the read operation via the read ECC signal connection or to provide additional data information associated with the first data in the write operation via the write ECC signal connection.

54. The apparatus of claim 52, further comprising a device selected from one of a computing system, a mobile computing system, an Internet of Things device, a virtual reality system, or an augmented reality system,
the device incorporating the memory device, the host, the read ECC signal connection, and the write ECC signal connection.

55. An apparatus, comprising:
a host configured to communicate with a memory device,
the host being further configured to:
provide first data to the memory device in performing computing functions and to provide an ECC associated with the first data, via a write ECC signal connection, to a memory array of the memory device, and
read from at least one mode register in the memory device,
the write ECC signal connection being configured to provide a data strobe from the memory device to the host, in a read operation,
the at least one mode register being accessible separately from the memory array and being configurable to indicate the memory device being configured to receive the ECC via the write ECC signal connection.

56. The apparatus of claim 55, the at least one mode register being further configurable to indicate a size of the ECC.

57. The apparatus of claim 55, the at least one mode register being further configurable to indicate the host to provide additional data information associated with the first data via the write ECC signal connection.

58. The apparatus of claim 55, further comprising a device selected from one of a computing system, a mobile computing system, an Internet of Things device, a virtual reality system, or an augmented reality system,
the device incorporating the memory device, the host, and the write ECC signal connection.

59. A method to operate an ECC function, comprising:
providing, by a memory device, first data stored in a memory array of the memory device to a host in performing computing functions; and
providing, by the memory device, an error-correction code (ECC) associated with the first data to the host, the ECC being not stored in the memory array in a first configuration of the memory device and being stored in the memory array in a second configuration of the memory device.

60. A method to operate an ECC function, comprising:

receiving, by a memory device, first data from a host in performing computing functions;

storing, by the memory device, the first data into a memory array of the memory device; and receiving, by the memory device, an ECC associated with the first data from the host, the ECC being not stored in the memory array in a first configuration of the memory device and being stored in the memory array in a second configuration of the memory device.

61. A method to operate an ECC function, comprising:

providing, by a memory device, first data stored in a memory array of the memory device to a host in performing computing functions;

providing, by the memory device, an ECC associated with the first data and stored in the memory array to the host in performing computing functions, via a read ECC signal connection, the read ECC signal connection being configured to provide a data mask from the host to the memory device in a write operation;

accessing, by the memory device, at least one mode register accessible separately from the memory array; and providing, by the memory device, based on the at least one mode register, the ECC stored in the memory array to the host via the read ECC signal connection.

62. A method to operate an ECC function, comprising:

receiving, by a memory device, first data from a host in performing computing functions;

receiving, by the memory device, an ECC associated with the first data from the host, via a write ECC signal connection;

storing the first data and the ECC into a memory array of the memory device, the write ECC signal connection being configured to provide a data strobe from the memory device to the host, in a read operation;

accessing, by the memory device, at least one mode register, accessible separately from the memory array; and receiving, by the memory device, based on the at least one mode register, the ECC via the write ECC signal connection and writing the ECC into the memory array.

63. A method to operate an ECC function, comprising:

receiving, by a host, first data from a memory device in performing computing functions;

receiving, by the host, an ECC associated with the first data via a read ECC signal connection, from the memory device, the first data and the ECC being stored in a memory array of the memory device, the read ECC signal connection being configured to provide a data mask from the host to the memory device in a write operation;

reading, by the host, from at least one mode register accessible separately from the memory array; and receiving, by the host, based on the at least one mode register, the ECC stored in the memory array via the read ECC signal connection.

* * * * *